US006791561B1

(12) United States Patent
Dawson

(10) Patent No.: US 6,791,561 B1
(45) Date of Patent: Sep. 14, 2004

(54) METHOD AND APPARATUS FOR RENDERING VIDEO DATA

(75) Inventor: Thomas Dawson, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 368 days.

(21) Appl. No.: 09/643,337

(22) Filed: Aug. 22, 2000

(51) Int. Cl.[7] ................................................ G09G 5/00
(52) U.S. Cl. ...................................................... 345/582
(58) Field of Search ................................. 345/422, 419, 345/582, 552, 501, 531, 572, 587, 427, 428, 589

(56) References Cited

U.S. PATENT DOCUMENTS

| | | | | |
|---|---|---|---|---|
| 4,935,879 | A | | 6/1990 | Ueda ........................... 364/522 |
| 5,481,669 | A | | 1/1996 | Poulton et al. .............. 395/164 |
| 5,621,867 | A | | 4/1997 | Murata et al. ............... 395/130 |
| 5,696,892 | A | | 12/1997 | Redmann et al. ............ 395/125 |
| 5,774,132 | A | | 6/1998 | Uchiyama .................... 345/503 |
| 5,796,407 | A | * | 8/1998 | Rebiai et al. ................ 345/586 |
| 5,798,770 | A | | 8/1998 | Baldwin ....................... 345/506 |
| 5,877,771 | A | | 3/1999 | Drebin et al. ................ 345/430 |
| 6,064,407 | A | * | 5/2000 | Rogers ......................... 345/568 |
| 6,195,122 | B1 | * | 2/2001 | Vincent ........................ 348/169 |
| 6,236,405 | B1 | * | 5/2001 | Schilling et al. ............. 345/582 |
| 6,331,852 | B1 | * | 12/2001 | Gould et al. ................. 345/419 |
| 6,348,917 | B1 | * | 2/2002 | Vaswani ....................... 345/418 |
| 6,421,067 | B1 | * | 7/2002 | Kamen et al. ............... 345/719 |
| 6,499,060 | B1 | * | 12/2002 | Wang et al. ................. 709/231 |
| 6,621,932 | B2 | * | 9/2003 | Hagai et al. ................. 382/233 |

OTHER PUBLICATIONS

"Rendering CGS Models with a ZZ–Buffer", Computer Graphics, vol. 24, No. 4, Aug. 1990; by David Salesin and Jorge Stolfi, Stanford University, Stanford, CA; pp. 67–76.
"Hardware Accelerated Rendering of Antialiasing Using a Modified A–Buffer Algorithm", Computer Graphics, Annual Conference Series 1997; Los Angeles, CA, by Stephanie Winner, Mike Kelley, Brent Pease, Bill Rivard, and Alex Yen; pp. 307–316.

* cited by examiner

*Primary Examiner*—Mark Zimmerman
*Assistant Examiner*—Enrique L Santiago
(74) *Attorney, Agent, or Firm*—Mayer Fortkort & Williams, PC; Karin L. Williams, Esq.; Michael P. Fortkort, Esq.

(57) ABSTRACT

The present invention provides a method and apparatus for rendering an input video stream as a polygon texture. The method provides process steps to receive the input video data in a Mip Map generator, wherein the Mip Map generator converts the video data to Mip Map data and stores the Mip Map data in a first memory storage device; wherein the first memory storage device is located in a V buffer. The method further includes sending a data set from a Z buffer to V buffer and mapping the data set to RGB values at a texel address in the V buffer memory. The data set includes U, V and Z coordinates, Mip Map level and channel identification data. The V buffer includes a V buffer fetch module that receives the data set from the Z buffer and maps to RGB data within V buffer memory.

27 Claims, 8 Drawing Sheets

Fragment format without video texturing

Fragment format with video texturing

US 6,791,561 B1

METHOD AND APPARATUS FOR RENDERING VIDEO DATA

FIELD OF THE INVENTION

This invention relates to computer-generated graphics and in particular to efficiently rendering video data.

BACKGROUND OF THE INVENTION

Currently, in order to render video data, a source video signal is received by an interface port and sent to a video decoder that digitizes the incoming data. Thereafter Mip Map data may be created in real time and written into a memory buffer (static texture memory) as texture data. Static texture memory stores texture data that is used by a polygon rasterizer ("rasterizer").

Conventional rendering systems are slow when polygon data is textured with live video data because video Mip Map data is continuously written into texture memory and at another instance the rasterizer attempts to read data from texture memory for rendering. Since we cannot read and write from the same memory location, memory conflict occurs. The problem gets worse when additional video channels are added because more time is spent in updating the texture memory than using the video texture for polygon rendering. The following describes existing techniques for rendering live video data.

FIG. 1 shows a conventional system for using video data as texture for rendering polygons. FIG. 1 shows an application software module 101 in a host computer system 101B that generates polygon descriptors for displaying a source image on a display device 107. Application software module 101 sends polygon descriptors 101A to a Rasterizer 102. Data is rasterized and polygon data is converted into fragment data. If polygon data is textured with video data then the color information related to each fragment generated from polygon data is read from static texture memory 103 and sent to a Z buffer 105, and thereafter sent to a frame buffer/video signal generator 106 that sends image data to display device 107.

Z buffer 105 sorts the fragment data from a rendered polygon relative to fragment from other polygons to maintain spatial order from a user's perspective. A typical Z buffer 105 includes an array of memory locations (Z buffer memory) where each location contains color value (U and V coordinate) and Z values which is the distance of a polygon fragment from a view plane.

For rendering video data, a polygon is sent directly from a video source 104 to video capture unit 108 that sends digitized video data to texture memory 103. Video capture unit 108 may include a video decoder to decode incoming video data or a separate video decoder may be connected to video capture unit 108.

FIG. 1 also shows three cubes C1, C2 and C3 displayed at any instance. C1, C2 and C3 are textured with video data. However, only cube C1 changes position and/or rotates over a time period "t". But in order to render video data as polygon texture, rasterizer 102, must re-rasterize all the three cubes over time period t. Texture data derived from the video source for the three cubes is stored in static texture memory 103, read from static texture memory 103 and are used to color polygon fragments that are then sent to display device 107 via buffer 105 and video signal generator 106. However, these operations are redundant because although only one cube is changing position, the stationery cubes must also be constantly re-rendered as well. This redundant rendering of objects that are static slows down the overall rendering process and is inefficient.

Hence, what is needed is a method and system that reduces the amount of data processing and efficiently displays video data without the foregoing continues re-rendering operations.

SUMMARY

The present invention addresses the foregoing drawbacks by providing a method and apparatus that efficiently displays input video data as animated textures without redundant rasterizing. In one embodiment, the process steps receive the input digitized video data in a Mip Map generator, wherein the Mip Map generator converts the digitized video data to Mip Map data and stores the Mip Map data in a V buffer memory. The method further includes sending a data set from a Z buffer to a V buffer and converting the data set to a texel address in the V buffer. The data set includes U, V and Z coordinates, Mip Map level data and channel identification data. Also, the data set is mapped to texel RGB data by the V buffer memory and then transferred back to the Z buffer.

In another aspect, the present invention provides an apparatus for rendering the input video data. The apparatus includes the Mip Map generator that receives the input video stream and converts input digitized video data to Mip Map data; and a V buffer that receives the Mip Map data associated with the input video data and a data set from the Z buffer. The V buffer includes a V buffer fetch module that receives the data set from the Z buffer and maps it to a texel address containing RGB data within the V buffer memory.

By virtue of the foregoing aspects of the present invention, digitized video data is sent to the Mip Map generator and then the Mip Map data is sent to the V buffer. The V buffer maps data from the Z buffer to a texel address containing RGB data for display and the rasterizer does not have to re-render every polygon that has as an applied video texture.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The use of similar reference numerals in different figure s indicates similar or identical items.

DETAILED DESCRIPTION OF THE PREFERRED EMBODIMENTS

Figure 1:
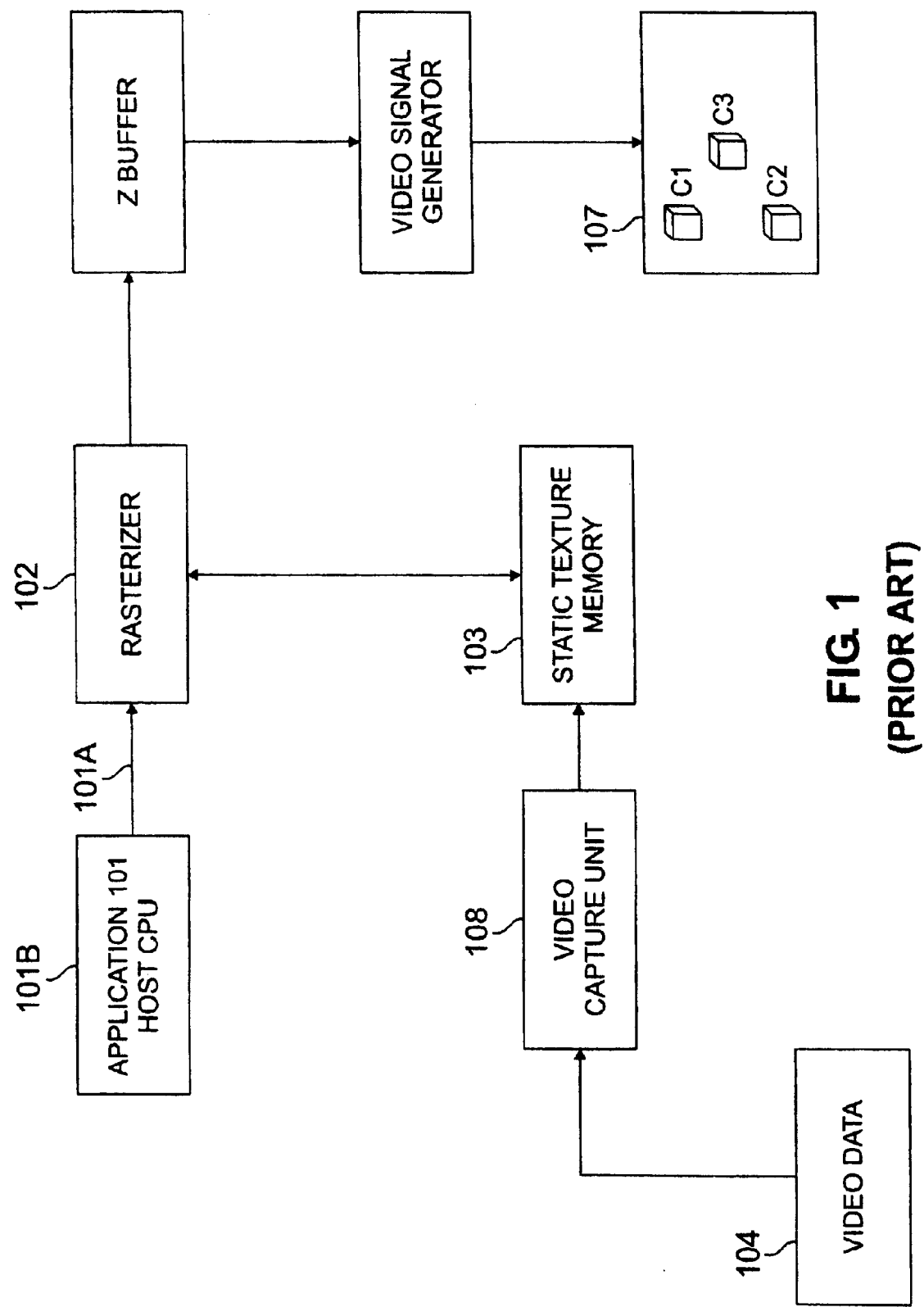
FIG. 1 illustrates a conventional system for rendering video data.
Figure 2A:
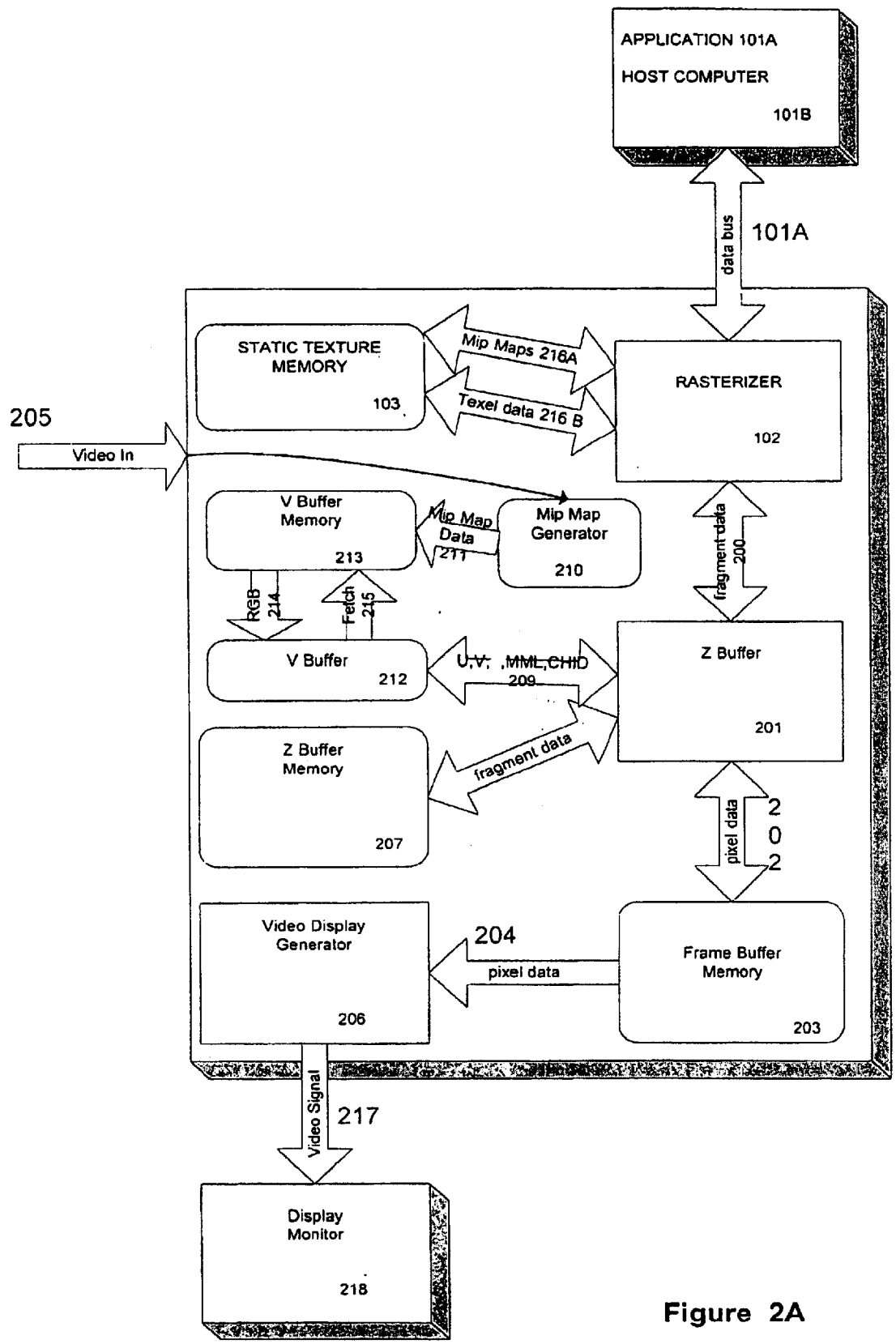
FIG. 2A is a block diagram of the architecture of the system according to one aspect of the present invention.

FIG. 2A shows a block diagram according to on e embodiment of the present invention with a video buffer "V buffer" 212. FIG. 2A shows an application program 101 that sends polygon descriptor data 101A to rasterizer 102 that rasterizes and converts data 101A to fragment data 200. Host computer 101B also sends Mip Maps 216A(as a part of 101A) to rasterizer 102 that transfers Mip Map data 216A to static texture memory 103. Thereafter, fragment data 200 is sent to Z buffer 201. It is noteworthy that an "A" buffer may be used instead of Z buffer 201.

Application 101A indicates if polygon data 101B is textured with video data. This indication causes the rasterizer 102 to determine U and V co-ordinates and Mip Map levels for all polygon fragments. U,V coordinate and Mip Map level data information is embedded in fragment data 200. As discussed below, application 101A sets a bit flag within each fragment indicating that a video texture is applied.

Incoming video data 205 is sent to a Mip Map generator 210 that generates Mip Map data 211 which is sent to a V buffer memory 213. Mip Map generator 210 may also include an analog/digital converter to digitize incoming video data, or a separate video digitizer (not shown) may be coupled to Mip Map generator 210.

If polygon data 101A is not textured with video data, then rasterizer 102 may acquire texel data 216B from static texture memory 103. Pixel data 202 based upon fragment data 200 and colored according to texel data 216B, is sent from Z buffer 201 to a frame buffer memory 203. Thereafter, pixel data 204 is sent from frame buffer memory 203 to a video display generator 206. A video signal 217 is generated by video signal generator 206 and sent to a display monitor 218 for displaying video image.

If fragment 200 data is textured with video data, then a data set 209 is sent to V buffer 212. Data set 209 includes U, V, and Z values, Mip Map level (MML) and Channel Identity values (CHID). Data set 209 is sent to V buffer 212. Based upon data set 209, V buffer 212 acquires RGB values 214 from a particular video frame stored in V buffer memory 213.

V buffer memory 213 has specific memory banks that can store Mip Map data for a particular video channel. CHID sent from Z buffer 201 identifies the memory bank of V buffer memory 213 from where data should be read. RGB values 214 are then sent to Z buffer 201 and then sent as pixel data 202 to frame buffer 203. Thereafter, pixel data 204 is sent to video display generator 206, and a video signal 217 is generated by video signal generator 206 and sent to a display monitor 218.

Figure 2B:
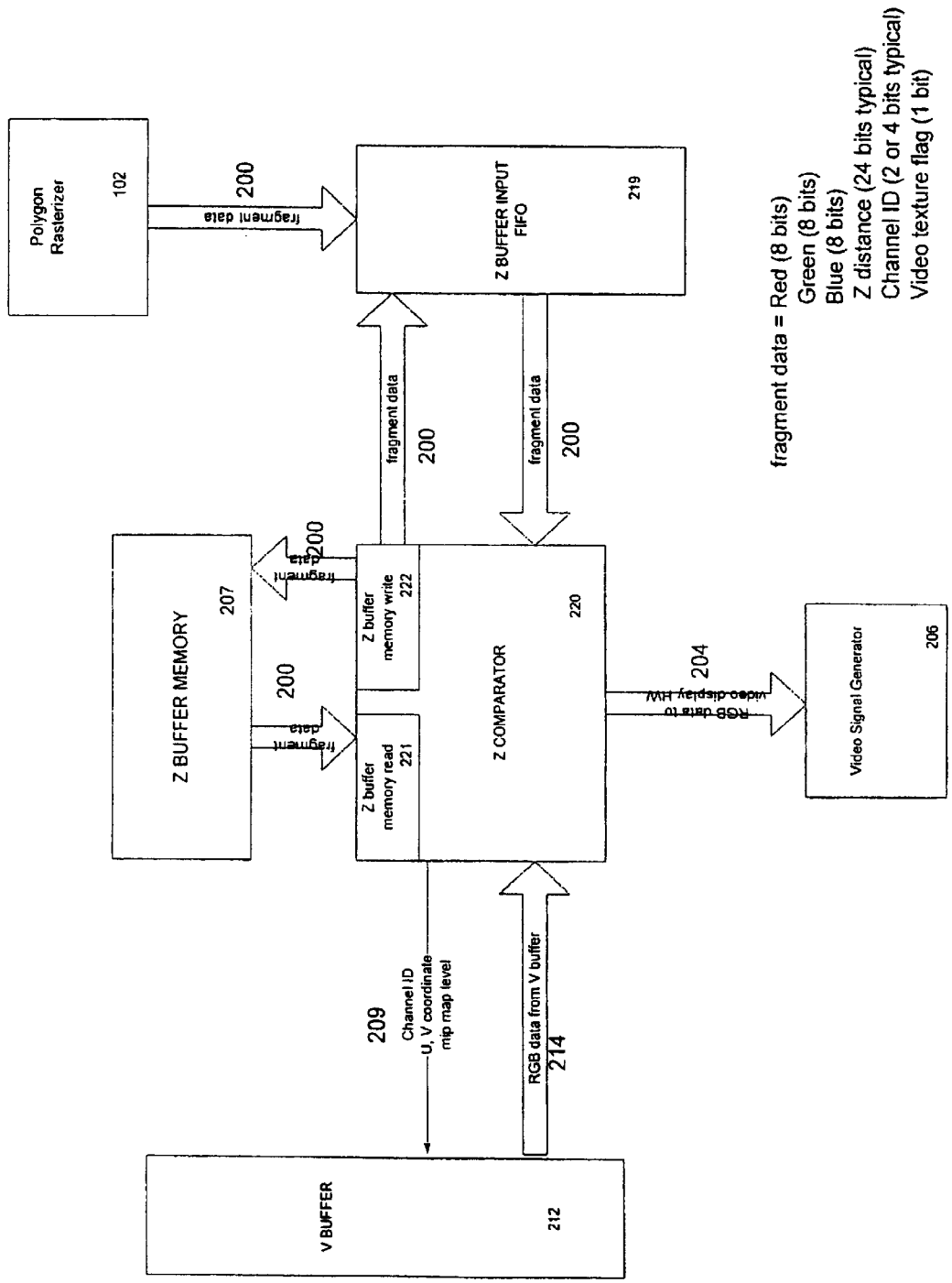
FIG. 2B illustrates a block diagram of a Z buffer.
Figure 2:
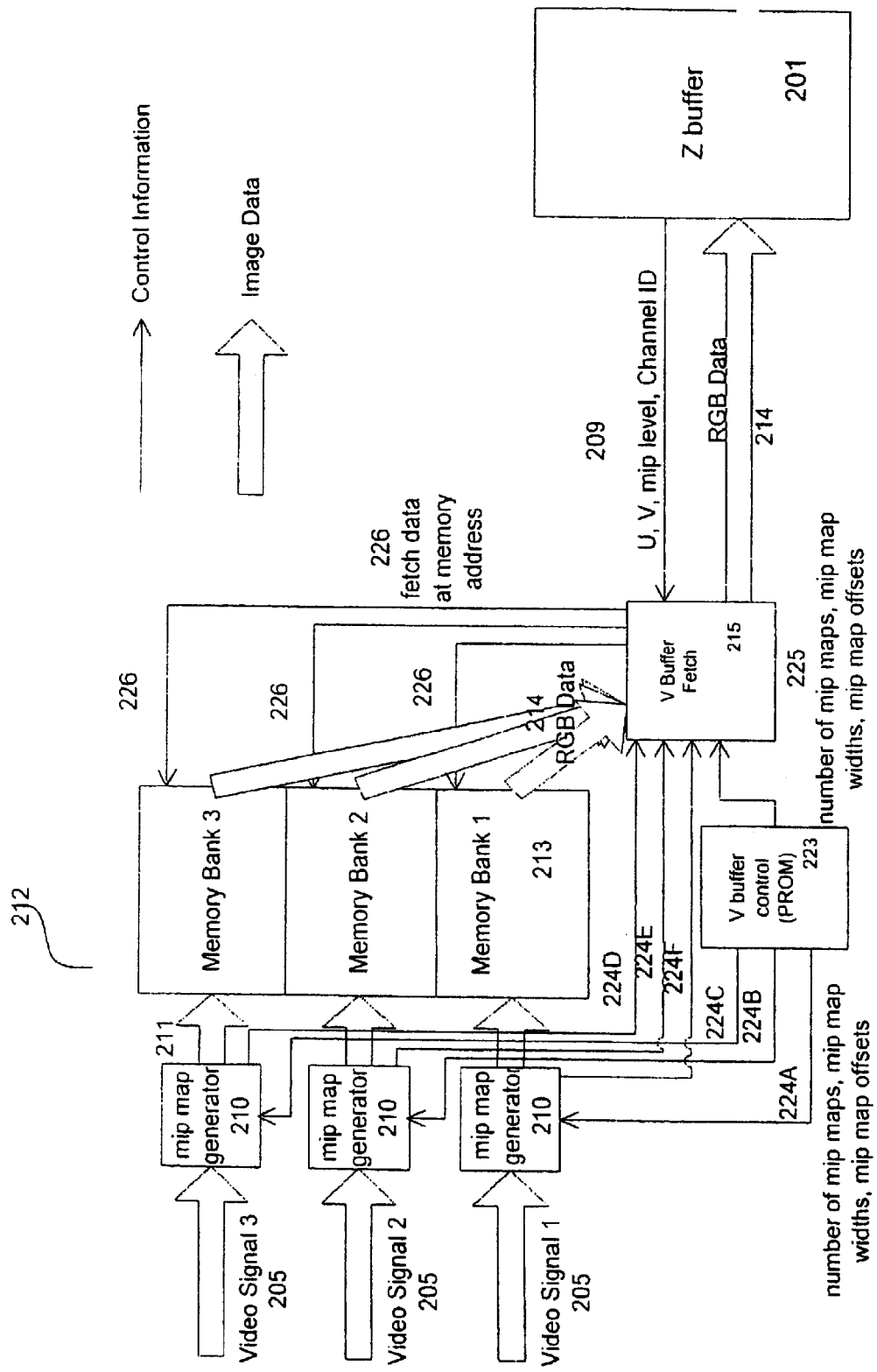
FIG. 2C illustrates a block diagram of a V buffer.
FIG. 2D is a block diagram of a V Buffer Fetch Module.

FIG. 2B is a block diagram showing various components of Z Buffer 201. Z buffer 201 receives fragment data 200 from rasterizer 102 and determines if fragment data 200 is textured with video data. Fragments that are not textured with video data are handled as discussed above. Fragment data 200 that includes a video bit flag is sorted based upon depth with respect to other fragments from a view plane. Thereafter Z buffer 201 extracts U,V co-ordinates and Mip Map level information and passes to V buffer 212 as data set 209 to obtain color information for a particular fragment at a given instance. The color information is then sent to frame buffer 203.

Fragment data 200 is received by an Input First In/First Out section (Input/FIFO) 219 that transfers fragment data 200 to a Z distance comparator 220 coupled to a Z buffer memory 207. Z comparator 220 includes a write buffer 222 and a read buffer 221. Read buffer 221 reads fragment data 200 associated with a particular pixel location, and write buffer 222 updates Z buffer memory 207 if a current fragment is closer than the previously stored fragment. Write buffer 222 also transfers fragments with video texturing to Input FIFO 219 for redisplay.

Z comparator 220 determines if a previous fragment is stored at a pixel location corresponding to fragment data 200. If previous fragment data is stored for a particular pixel location, then Z distance comparator 220 determines if current fragment's Z distance from a view plane is less than the previously stored fragment data. If the Z distance of the current fragment is less than the previous fragment, then the current fragment is stored in Z buffer memory 207, or else the current fragment is discarded.

Z distance comparator 220 also determines if fragment data 200 is textured with video data. If fragment data 200 is not textured with video data, then RGB values extracted from the fragments are sent to video signal generator 206 via frame buffer memory 203.

If fragment data 200 is textured with video data, then as discussed above data set 209 is sent to V buffer 212 via Z buffer 201 to obtain RGB values.

FIG. 2C is a block diagram of V Buffer 212. Mip Map generator 210 receives video signal 205 and generates Mip Map data 211. Prior to generating Mip Map data 211, video signal 205 is digitized by a video digitizer (not shown). The video digitizer may be separate from Mip Map generator 210 or integrated with Mip Map generator 210. Thereafter, Mip Map data 211 are sent to V buffer memory 213. As shown in FIG. 2C, V buffer memory 213 has three memory banks, Memory Bank1, Memory Bank 2 and Memory Bank 3 that receive Mip Map data 211 from the three Mip Map generators 210. The three memory banks and Mip Map generators are illustrative only and the present invention is not limited to any particular number of memory banks and/or Mip Map generators.

V buffer 212 includes a V Buffer control 223 that stores pre-programmed instructions including number of Mip Maps, Mip Map width and Mip Map off-set information. Upon power up or reset of V buffer control 223, control signal 224A, 224B, and 3224C are sent to Mip Map generator 210. Also, V buffer control 223 sends control signal 225 to V Buffer Fetch module 215 with information regarding the number of Mip Maps to be generated by Mip Map Generator 210, Mip Map widths and Mip Map offsets data. Intermittent read enable signals 224D, 224E and 224F are sent by Mip Map generator 210 to V buffer Fetch module 215 indicating that data is available for reading. After receiving control signals 224D, 224E or 224F, V Buffer Fetch module 215 generates a control signal 226 to fetch RGB data from a particular memory address. RGB data 214 is transferred from V buffer memory 213 to V buffer Fetch module 215 and then sent to Z Buffer 201.

To read RGB color information from V buffer memory 213 the following parameters can be used:
CHID that specifies the memory bank from where data is read;
Mip Map level that specifies a base offset in the memory bank; and
U, V co-ordinates that indicate a further offset.

Figure 2D:
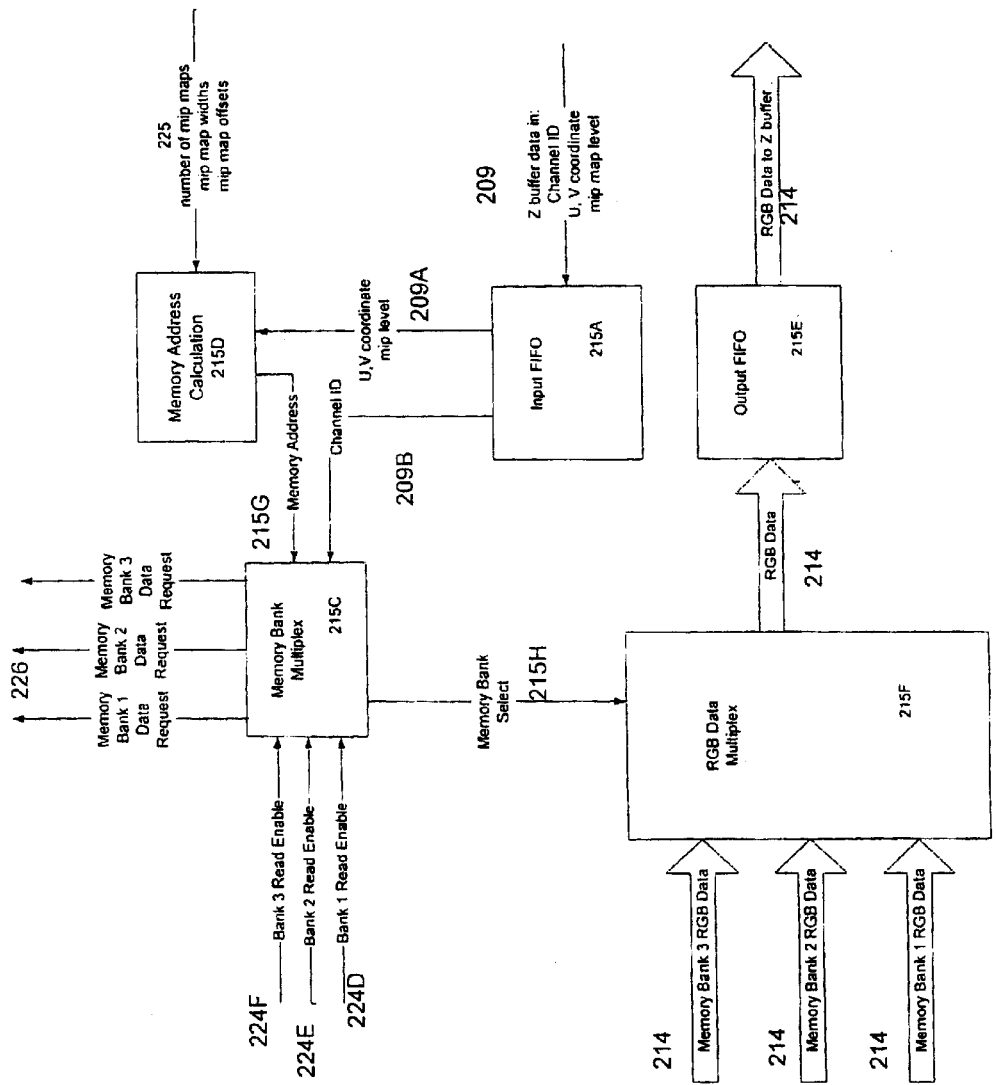

FIG. 2D is a block diagram of V Buffer Fetch module 215 architecture that determines the texel memory address from where RGB data 214 is read out. Data set 209 that includes Channel ID, U,V coordinates, and Mip Map level are received from Z buffer 201 in an Input FIFO module 215A. Thereafter, U,V, and Mip Map level information 209A is transferred to a Memory Address Calculation module 215D that also receives control signal 225 from V buffer control 223 (FIG. 2C). Channel ID information 209B is transferred to Memory Bank Multiplex 215C. Based upon U,V, Mip Map level and signal 225, Memory Address Calculation module 215D determines memory addresses.

Memory Address may be determined by:
Mip level offset+(V co-ordinate *mip level width)+U coordinate.

Thereafter, memory addresses 215G are transferred to a memory bank multiplex 215C.

Control signals 224D, 224E and 224F are sent to memory bank multiplex 215C. Multiplex 215C also generates control signal 226 that are controlled by read enable signals 224D, 224E and 224F. Memory bank multiplex 215C generates a memory bank select signal 215H that transfers RGB data 214 from a particular memory bank of V buffer memory 213 to RGB data Multiplex 215F. Thereafter RGB data 214 is transferred to an Output FIFO (first in/first out) and then sent to Z buffer 201.

Figure 3:
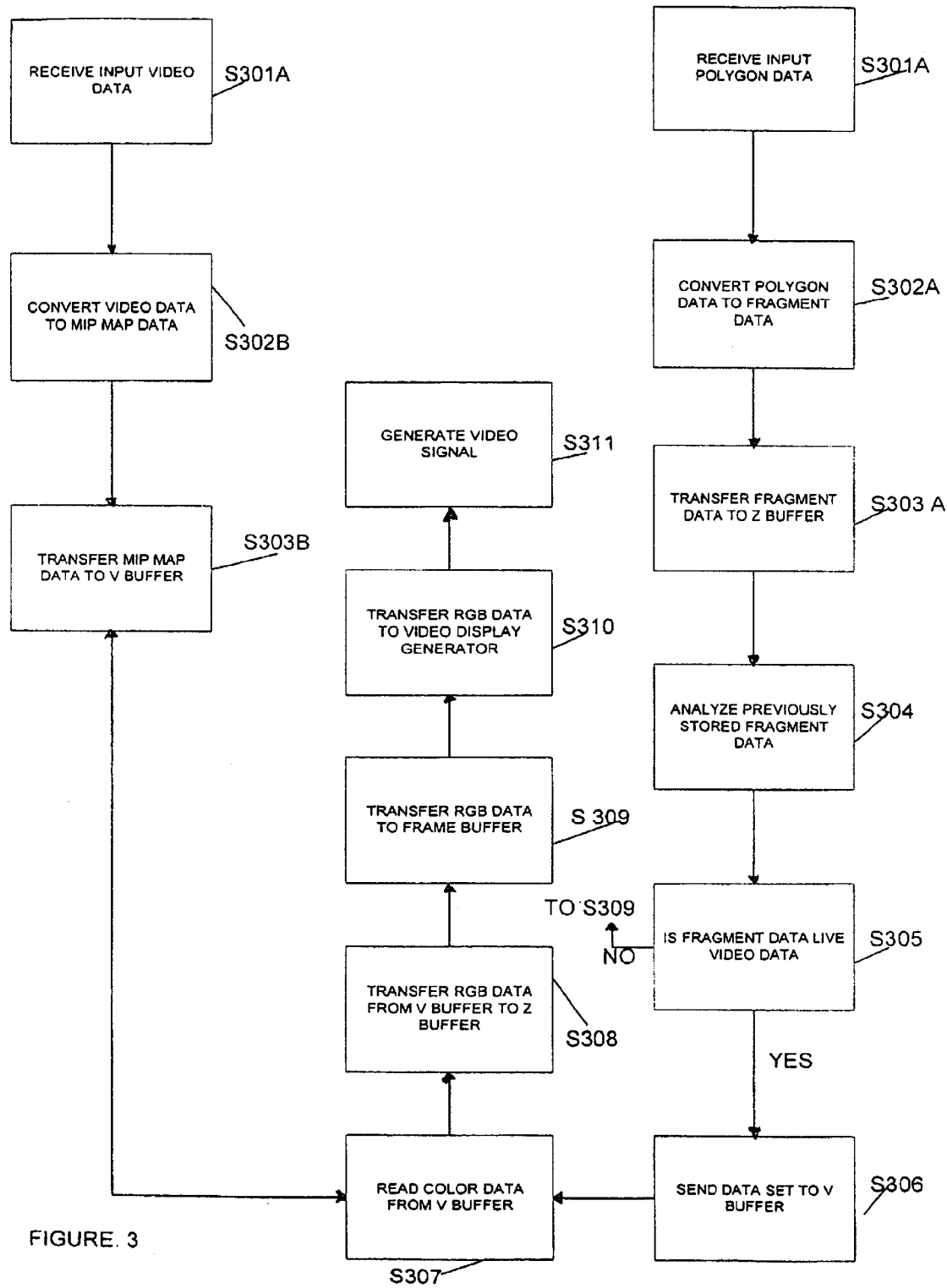
FIG. 3 is a flow diagram showing process steps for displaying video data using a V buffer.

FIG. 3 shows a block diagram of process steps according to another aspect of the present invention. In step S301A, the process receives input polygon data 101A from application 101. Input data 101A is received by rasterizer 102. Rasterizer 102 also receives texel data from application 101 and transfers texel data 216B to static texture memory 103. Simultaneously in step S301B, input video data 205 is received by Mip Map generator 210.

Figure 4:
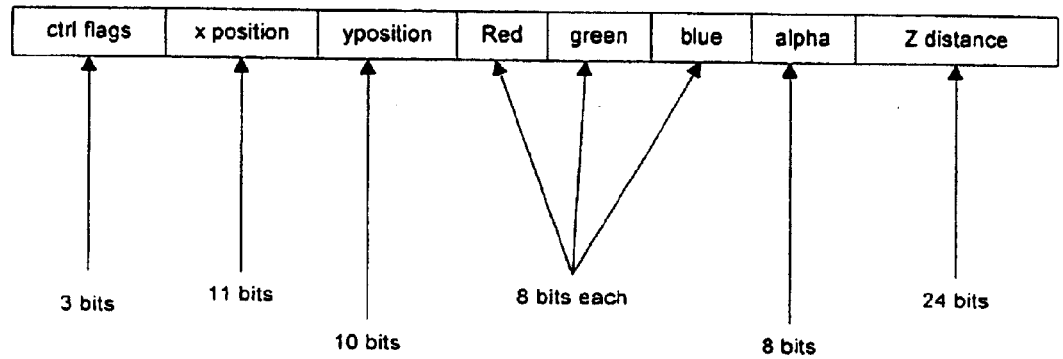
FIG. 4 illustrates a sample format for fragment data.
Figure 4:
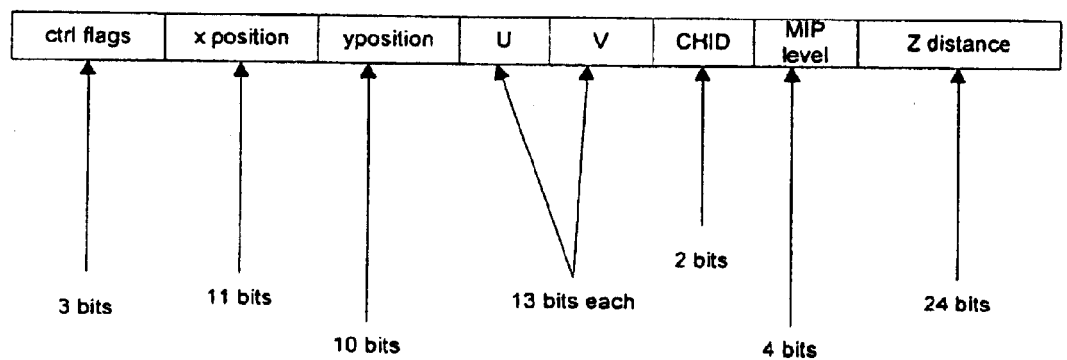

In step S302A, rasterizer 102 converts input polygon data 101A to fragment data 200. An example of fragment data format is shown in FIG. 4. It is noteworthy that the invention is not limited to a particular format of fragment data. FIG. 4 shows fragment data 200 format for data that is video textured and data without video texture. Simultaneously in step S302B, Mip Map generator 210 converts incoming video data 205 to Mip Map data 211. Prior to conversion to Mip Map data 211, incoming video data 205 is digitized (not shown).

In step S303A, Rasterizer 102 transfers fragment data 200 to Z buffer input FIFO module 223. In step S303B, Mip Map generator 210 transfers Mip Map data 211 to V buffer memory 213.

In step S304, Z distance comparator 220 determines if any fragment data is stored for the pixel location associated with fragment data 200. If there are no previously stored fragment data, then the received fragment data 200 becomes the "current" fragment data. If there is previously stored fragment data, then Z comparator 220 compares the Z distance between the data received with the previously stored fragment data. If the Z distance of the current fragment is less than the previously stored fragment data, it then becomes the current fragment and is stored in Z buffer memory 207.

In step S305, Z buffer comparator 220 determines whether the fragment data 200 is textured with video data. Application 101 flags polygon data 101A to indicate that fragment data 200 is textured with video data. This causes the rasterizer 103 to detect the video bit flag to indicate that fragment data 200 is textured with video data. If the fragment data is not textured with video, then the process moves to step S309.

If fragment data 200 is textured with video, then in step S306, data set 209 is sent to V buffer 212. Data set 209 includes U, V values, Mip Map level data and a channel identification number.

In step S307, V Buffer fetch module 215 fetches RGB data 214 from V buffer memory 213. To access RGB data, CHID specifies the memory bank of V buffer 213 from where data is read, Mip Map level specifies a base offset and U,V coordinates specify specific texel location.

In step S308, V Buffer 212 sends RGB data 214 to Z buffer 201.

In step S309, Z buffer 201 sends RGB data 214 to frame buffer memory 203.

In step S310, frame buffer memory 203 transfers RGB data 214 as pixel data 201 to video display generator 206 and thereafter in step S311, a video signal 220 is generated and sent to a display monitor 218.

Figure 5:
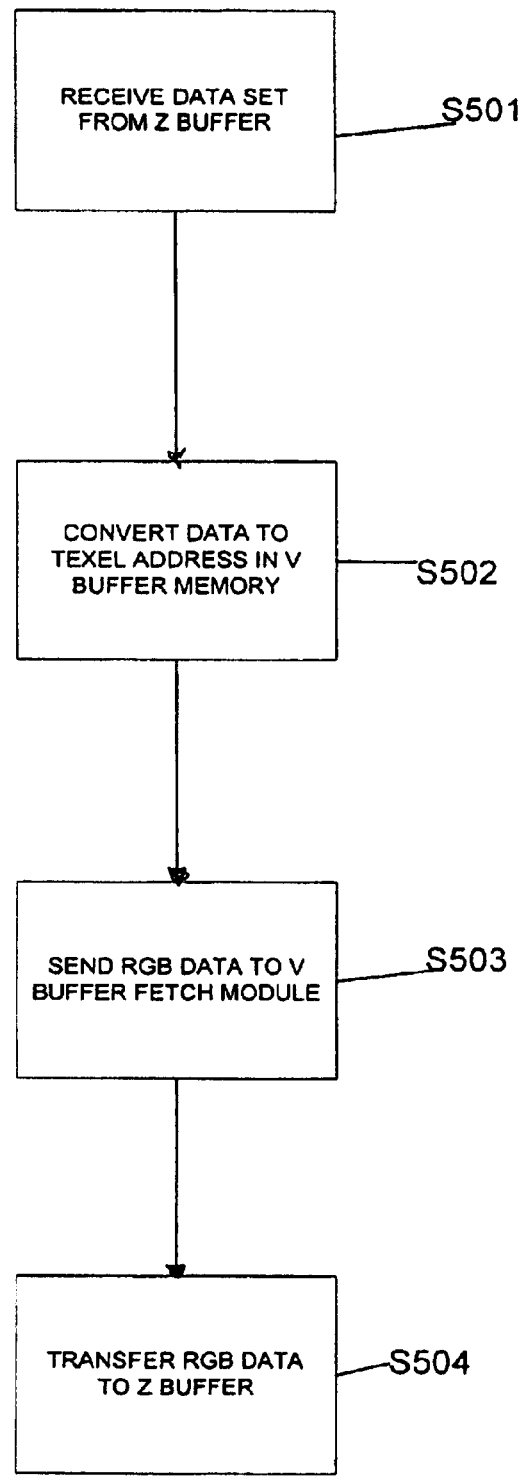
FIG. 5 is a flow diagram showing process steps showing data transfer between a V buffer and a Z buffer.

FIG. 5 shows a flow diagram illustrating process steps for sending RGB data 214 from V Buffer 212 to Z buffer 201.

In step S501, V buffer fetch module 215 receives data set 209 from Z buffer 201. Data set 209 includes U, V values, Mip Map level and channel identification number.

In step S502, V buffer fetch module 215 generates memory address for RGB data. Memory address is generated by Memory Address Calculation module 215D and is based upon U,V values and the Mip Map level, components of data set 209, and also on signal 225 (FIG. 2C). Memory addresses may be calculated by:
Mip Map level offset+(V coordinate*Mip Map level width)+U coordinate In step S503, V buffer memory 213 sends RGB data 214 to V Buffer Fetch module 215. Read enable signals 224D, 224E and 224F indicate that Mip Map data is readable from V buffer memory 213. Memory bank select signal 215H indicates the memory bank from where RGB data 214 is be read. Thereafter, V buffer memory 213 sends RGB data 214 to RGB data multiplex 215F and then to Output FIFO 215E.

In step S504, V buffer fetch module 215 transfers RGB data 214 to Z buffer 201.

One of the advantages of the present system is that digitized video data is sent directly to the Mip Map generator 211 and then sent to V buffer 212. V buffer 212 provide RGB data for display and the rasterizer does not have to continuously re-render every polygon of a particular scene. Only those polygons that change positions and/or are rotating need to be rendered by rasterizer 103 that has video texture applied to it.

Although the present invention has been described with reference to specific embodiments, these embodiments are illustrative only and not limiting. Many other applications and embodiments of the present invention will be apparent in light of this disclosure and the following claims.

What is claimed is:

1. A method for combining real-lime video data with video graphics data, comprising:

separating processing of the real-time video data from a rasterization process;

storing real-time video data in a memory that is physically separate from a memory used to read/write texture data;

inserting a flag in a data set during rasterization processing, said flag indicating that the data set is to be textured with video data; and obtaining a color value from the memory storing the real-time data and combining the color value with a data set output by the rasterizer.

2. The method according to claim 1, further comprising combining the real-time video data with the video graphics data only after a rasterization process is complete.

3. The method according to claim 1, further comprising providing a memory for each of a plurality of real-time video data channels, each of which is separate from the memory used to read/write texture data.

4. The method according to claim 3, further comprising receiving a plurality of real-time video data channels.

5. The method according to claim 1, further comprising:
receiving the real-time video data in a Mip Map generator, wherein the Mip Map generator converts the video data to Mip Map data;
storing the Mip Map data in a first memory storage device, wherein the first memory storage device is located in a V buffer,
sending a data set from a Z buffer to the V buffer; and
determining a texel memory location in the first memory storage device, wherein the texel memory location is based upon the data set.

6. The method according to claim 5, further comprising:
transferring RGB data from the texel memory location to the Z buffer, wherein the RGB data is received by a Z buffer comparator; and
transferring the RGB data from the Z buffer to a second memory storage device.

7. The method according to claim 5, wherein the data set includes U and V coordinates.

8. The method according to claim 5, wherein the data set includes Mip Map level data.

9. The method according to claim 5, wherein the data set includes channel identification data.

10. The method according to claim 5, wherein the data set is converted to RCB data by a V buffer memory.

11. An apparatus for rendering input video data, comprising:
a first memory storing texture data;
a second memory storing real-time video data, said second memory being physically separate from the first memory used to read/write texture data; and
said processor obtaining a color value from the memory storing the real-time data and combining the color value with a data set output by the rasterizer.

12. The apparatus according to claim 11, further comprising a Mip Map generator that receives the input video data and converts the input data to Mip Map data, and stores the Mip Map data in the second memory.

13. The apparatus according to claim 12, further comprising:
a V buffer that receives the Mip Map data associated with the input video stream and a data set from a Z buffer; and
a V buffer memory, wherein the V buffer memory stores Mip Map data.

14. The apparatus according to claim 13, wherein the data set includes U and V coordinates.

15. The apparatus according to claim 13, wherein the data set includes Mip Map level data.

16. The apparatus according to claim 13, wherein the data set includes channel identification data.

17. The apparatus according to claim 13, wherein the V buffer includes a V buffer fetch module that receives the data set from the Z buffer.

18. The apparatus according to claim 17, wherein the V buffer fetch module receives the RGB data from the V buffer memory.

19. A method for transferring RGB data from a storage device to a Z buffer comprising:
separating processing of real-time video data from a rasterization process;
storing real-time video data in a memory this is physically separate from a memory used to read/write texture data;
transferring a data set from a Z buffer to a memory address calculation module;
determining memory addresses for RGB data stored in the memory storing the real-time video data based upon the data set; and
transferring the RGB data from the memory storing the real-time video data buffer to the Z buffer.

20. The method according to claim 19, wherein the data set includes UV coordinates.

21. The method according to claim 19, wherein the data set includes Mip Map level data.

22. The method according to claim 19, wherein the data set includes channel identification values.

23. A method for combining real-time video data with video graphics data, comprising:
inserting a flag in a data set during rasterization processing, said flag indicating that the data set is to be textured with video data; and
obtaining a color value from a memory storing the real-time data and combining the color value with a data output by the rasterizer.

24. The method according to claim 23, further comprising separating processing of the real-time video data from a rasterization process.

25. The method according to claim 23, further comprising storing real-time video data in a memory that is physically separate from a memory used to read/write texture data.

26. A method for combining real-time video data with video graphics data, comprising:
separating processing of the real-time video data from a rasterization process; and
storing real-time video data in a memory that is physically separate from a memory used to read/write texture data.

27. The method according to claim 26, further comprising obtaining a color value from a memory storing the real-time data and combining the color value with a data set output by a rasterizer.

* * * * *

UNITED STATES PATENT AND TRADEMARK OFFICE
CERTIFICATE OF CORRECTION

PATENT NO. : 6,791,561 B1
DATED : September 14, 2004
INVENTOR(S) : Thomas Dawson It is certified that error appears in the above-identified patent and that said Letters Patent is hereby corrected as shown below:

Column 1,
Line 43, after "polygon", change "relative to fragment" to -- relative to fragments --

Column 2,
Line 6, after "foregoing", change "continues" to -- continuous --.
Lines 61 and 62, after "different" change "figure s" to -- figures --.
Line 65, after "to," change "on e" to -- one --.

Column 6,
Line 27, after "RGB data 214 is", delete "be".

Column 7,
Line 29, after "a first memory storing texture data", insert -- inserting a flag in a data set during rasterization processing, said flag indicating that the data set is to be textured with video data --.

Column 8,
Line 12, after "separate from a memory used to read/write texture data;", insert -- inserting a flag in data set during rasterization processing, said flag indicating that the data set is to be textured with video data --.
Line 35, before first word "ouput", insert -- set --.
Line 45, after "process;", insert -- inserting a flag in a data set during rasterization processing, said flag indicating that the data set is to be textured with video data --.

Signed and Sealed this

Fifth Day of April, 2005

JON W. DUDAS
*Director of the United States Patent and Trademark Office*